United States Patent [19]

Rollins

[11] 4,079,833
[45] Mar. 21, 1978

[54] CONVEYOR CHAIN FLIGHT ASSEMBLY

[75] Inventor: Lester G. Rollins, Franklin, Pa.

[73] Assignee: Joy Manufacturing Company, Pittsburgh, Pa.

[21] Appl. No.: 672,193

[22] Filed: Mar. 31, 1976

[51] Int. Cl.² .................................................. B65G 19/08
[52] U.S. Cl. ........................................ 198/731; 198/733
[58] Field of Search ................ 198/728, 729, 731, 733

[56] References Cited

U.S. PATENT DOCUMENTS

| 422,139 | 2/1890 | Maxon | 198/729 |
|---|---|---|---|
| 540,617 | 6/1895 | Maxon | 198/731 X |
| 1,970,250 | 8/1934 | Redler | 198/731 X |
| 2,278,853 | 4/1942 | Hudson | 198/731 |
| 2,910,170 | 10/1959 | Dodson | 198/728 X |
| 3,399,757 | 9/1968 | Braun et al. | 198/733 X |
| 3,653,492 | 4/1972 | Temme | 198/731 |
| 3,737,023 | 6/1973 | Collier | 198/734 |

FOREIGN PATENT DOCUMENTS

| 1,175,150 | 7/1964 | Germany | 198/729 |
|---|---|---|---|
| 2,219,107 | 10/1973 | Germany | 198/731 |
| 2,319,917 | 11/1973 | Germany | 198/733 |
| 1,025,287 | 4/1966 | United Kingdom | 198/733 |

*Primary Examiner*—Evon C. Blunk
*Assistant Examiner*—Richard K. Thomson

[57] ABSTRACT

Conveyor flight assemblies or more particularly improved connecting means for connecting a flight to a conveyor chain.

5 Claims, 4 Drawing Figures

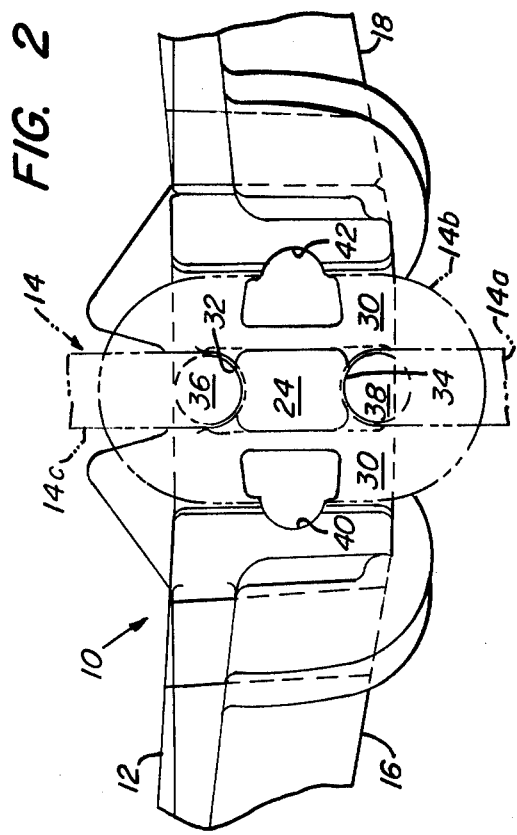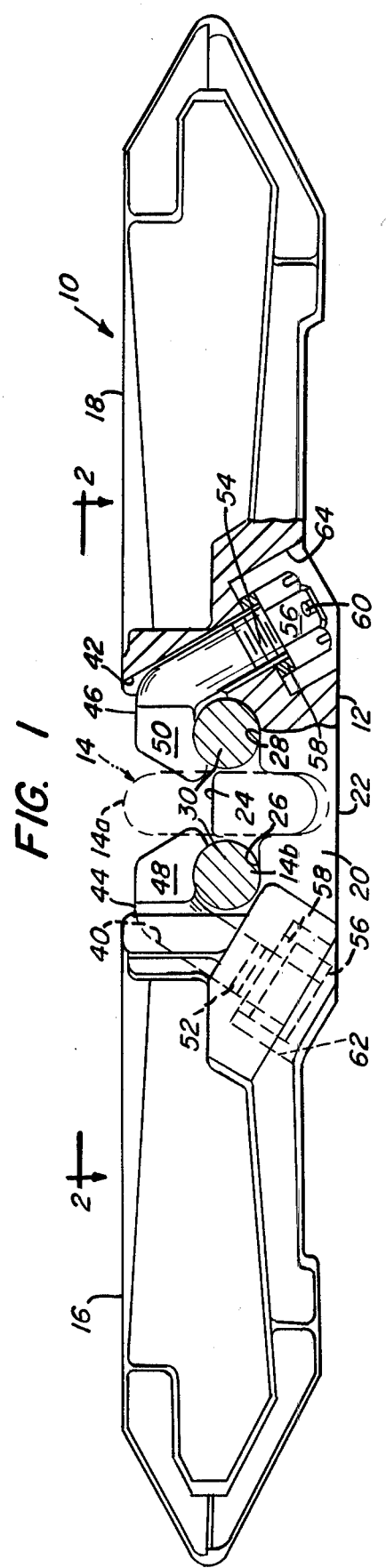

CONVEYOR CHAIN FLIGHT ASSEMBLY

The invention relates to conveyor chain assemblies having flights or scraper bars attached at regular intervals along a chain for conveying material, such as coal, along a substantially horizontal surface. Flight conveyors are well known and are exemplified by U.S. Pat. No. 3,712,456 to Kincaid patented Jan. 23, 1973.

The present invention is concerned with providing an improved flight design and more specifically an improved means for connecting the flight to the conveyor chain.

According to the present invention a one-piece flight member is placed beneath the conveyor chain and a horizontally lying link of the chain is placed within a centrally disposed pocket formed on an upper surface of the flight member. Clamping means engage the upper surface of the horizontally disposed chain link and clamp the flight member to the chain link.

The invention is illustrated in the accompanying drawings, in which:

FIG. 1 is a front elevational view partly in section of one preferred embodiment of the present invention;

FIG. 2 is a partial plan view of the embodiment of FIG. 1;

Figure 3:
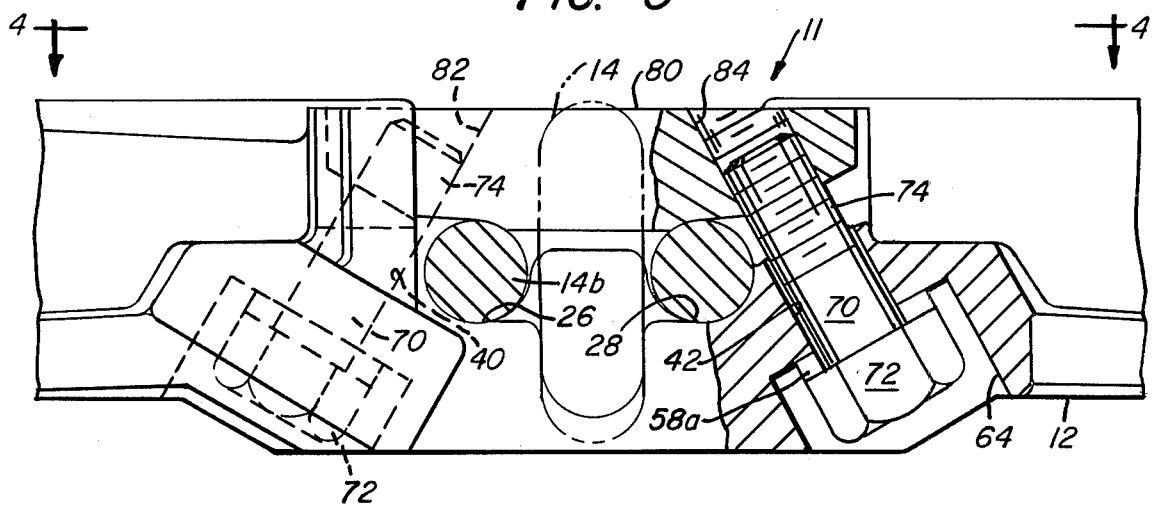
FIG. 3 is a partial front elevational view partly in section of a second preferred embodiment of the present invention.

With particular reference to FIGS. 1 and 2 there is shown a preferred embodiment of the conveyor chain flight assembly 10. The assembly comprises a one-piece flight member 12 connected to a conventional chain 14 having chain links 14a and 14c which lie in a substantially vertical plane and links 14b connected between links 14a and 14c, which lie in a substantially horizontal plane. The flight member 12 extends transversely to the axial movement of the chain 14 and includes outwardly extending material engaging portions 16 and 18 and an intermediate chain engaging portion 20. The material engaging portions 16 and 18 may be of any conventional design as shown in the drawing. The novel intermediate connecting portion 20 of the flight member 12 includes a substantially flat bottom surface 22 which is adapted to slide along a plate or trough containing the material to be conveyed as the chain 14 is driven by any conventional means. The upper surface 24 of the connecting portion 20 is formed with a pair of parallel troughs 26, 28 which are equally spaced on either side of the center line of the flight member 12. The troughs 26, 28 extend in the direction of the axis of the chain 14 and are spaced and sized so as to accept therein an intermediate body portion 30 of a horizontal chain link 14b. Also formed in the connecting portion 20 of the flight member 12 are vertically extending troughs 32 and 34 which are spaced and sized so as to accommodate the adjacent end portions 36 and 38 of the respective vertical chain links 14c and 14a.

On either side of the chain 14, a bore 40, 42 is provided through the flight member 12. The bores 40, 42 are angled so that the longitudinal axes thereof intersect above the flight member 12 at a point on the vertical transverse axis of flight member 12. Clamping bolts 44, 46 are inserted through respective bores 40 and 42. The clamping bolts 44, 46 include chain engaging end portions 48, 50 and threaded opposite end portions 52, 54 respectively. Each of the bolts is secured in place by means of a nut 56 and a washer 58 placed intermediate the nut and the flight member 12. In order to prevent the nut 56 from loosening during operation of the conveyor assembly, a cotter pin 60 is inserted through the nuts 56 and bolts 44, 46.

In order to accommodate the nuts 56 on the bolts 44, 46 without adding to the vertical dimension of the flight member 12 the bores 40 and 42 are countersunk as shown at 62 and 64 respectively.

Figure 4:
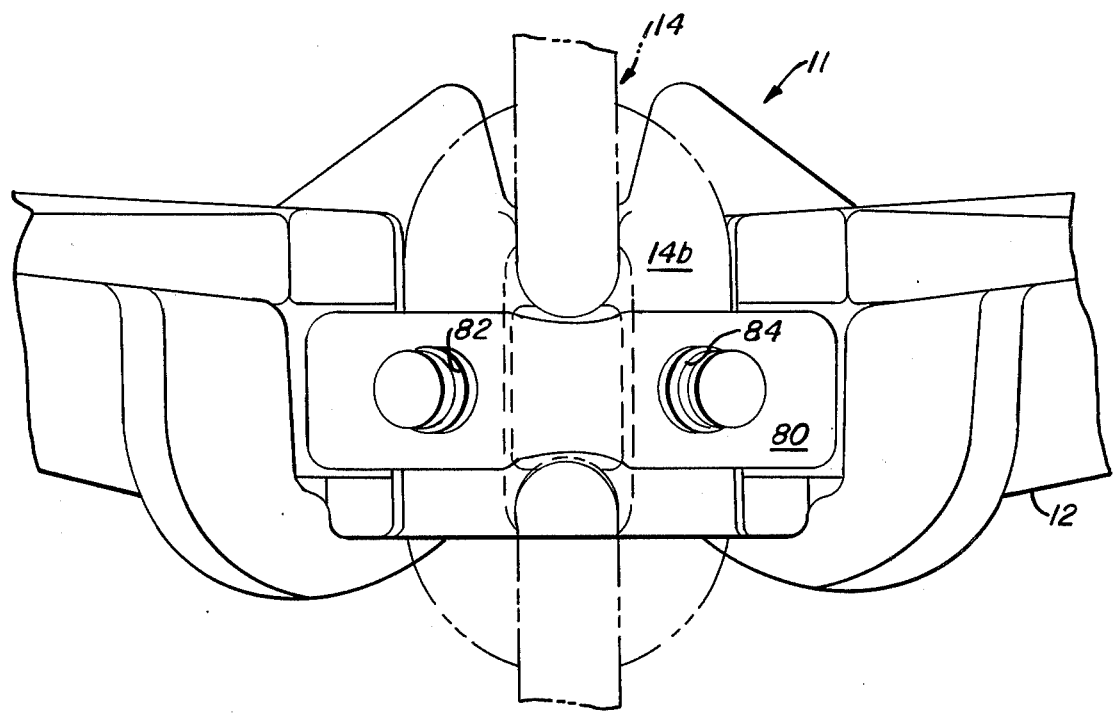
FIG. 4 is a plan view of the embodiment of FIG. 3.

A slightly modified embodiment 11 of the present invention is shown in FIGS. 3 and 4. The flight member 12 in the embodiment of FIGS. 3 and 4 is substantially the same as that described hereinabove except for a portion thereof being cut away near the upper ends of bores 40 and 42 the reasons for which will become evident; the means for connecting the flight member 12 to the chain 14 being the primary difference in the embodiment of FIGS. 3 and 4.

In the embodiment of FIGS. 3 and 4, a pair of straight bolts 70 extend through the respective bores 40, 42 and include an integral head end portion 72 and a threaded end portion 74. The bolts 70 are inserted through the flight member 12 so that the head end portion 72 is located entirely within the countersunk portion 64 of bore 42, for example. A washer 58a extends between the head portion 72 of bolt 70 and flight member 12. A clamping member 80 formed separately from flight member 12 is placed across a horizontally aligned chain link 14b and has a lower surface in firm engagement therewith. A pair of threaded bores 82, 84 are formed in member 80 and have axes which coincide with the axes of respective bores 40 and 42 in member 12 so that the bolts 70 may directly threadingly engage the respective bores 82 and 84 in order to provide clamping engagement between the flight member 12 and the chain link 14b.

In order to connect a flight member 12 to the chain 14 it is only necessary that one of the horizontally lying chain links such as chain link 14b be placed into the troughs 26 and 28 in the flight member 12 and thereafter the clamping means be attached thereto. In the embodiment of FIGS. 1 and 2 the clamping bolts 44 and 46 are inserted through the respective bores 40, 42, and thereafter, nuts 56 are placed on the threaded ends 52, 54 thereof in order to securely clamp the chain link 14b between the clamping ends 48, 50 of the respective clamping bolts 44, 46 and the troughs 26, 28 of the flight member 12. In the embodiment of FIGS. 3 and 4, after the chain link 14b is placed within the troughs 26, 28 of the flight member 12, the clamping member 80 is placed above the chain link 14b, and thereafter, the bolts 70 are inserted through the respective bores 40 and 42 from below and into threaded engagement with the clamping member bores 82, 84 to thereby clamp the chain link 14b between the clamping member 80 and the flight member 12. In this manner the flight member 12 is securely attached to the chain 14 for movement therewith along a trough or plate containing material to be conveyed.

Flight members according to the present invention are easily and economically connected to the chain for movement therewith and have maximum strength as compared to other flight members of equal vertical cross section.

The invention herein is directed to an improved means for connecting the flight to the conveyor chain. Accordingly, modifications can be made to the embodiments discussed hereinabove by one skilled in the art without departing from the scope of the invention, for example: differing configuration clamping arrangements may be utilized; the bores 40 and 42 may be threaded and cooperate with exterior threads of the clamping means thereby eliminating the necessity of the upwardly extending countersink 64; and the like.

What is claimed is:

1. A conveyor flight assembly comprising:
   an elongated flight member having a bottom surface adapted to slide adjacent a material support surface and an upper surface including an upwardly open centrally disposed pocket;
   said central pocket adapted to receive and seat a horizontally disposed chain link therein;
   a pair of bores extending through said flight member between said bottom surface and said top surface and being disposed on opposite sides of said pocket;
   the longitudinal axes of said bores being angled with respect to each other to intersect above said flight member generally at a point on the vertical transverse axis of said flight member;
   clamp means at least partially disposed in said bores for providing axial forces within said bores producing a resulting clamping force on said chain link; and
   said axial forces directed along lines that converge above said flight member.

2. A conveyor flight assembly as specified in claim 1 wherein said clamp means includes elongated bolts having integral clamping end portions engaging the upper mid-section of such chain link.

3. A conveyor flight assembly as set forth in claim 2 wherein said bolts have opposite end portions being externally threaded; internally threaded nuts on said threaded end portions for tightening said clamping end portions against the upper surface of such chain link; and said bores being countersunk to provide an area within said flight member for said nuts.

4. A conveyor flight assembly as specified in claim 1 wherein said clamp means includes a clamping member separate from said flight member and in engagement with the upper surface of such chain link; and bolts having externally threaded end portions in engagement with internally threaded bores in said clamping member for urging said clamping member towards said flight member and thereby clamping such chain link therebetween.

5. A conveyor flight assembly as specified in claim 4 wherein said bolts include a unitary head on the end opposite said threaded end thereof and said bores being countersunk to provide an area within said flight member for said head portions.

* * * * *